United States Patent [19]

Chang et al.

[11] Patent Number: 5,098,752
[45] Date of Patent: Mar. 24, 1992

[54] RECOVERABLE ELASTOMERIC SLEEVE AND METHOD FOR INSTALLATION AND USE

[75] Inventors: Rong J. Chang, Fremont; Mario A. Gutierrez, Union City; John W. Hoffman, Menlo Park; John A. Midgley, San Carlos, all of Calif.

[73] Assignee: Raychem Corporation, Menlo Park, Calif.

[21] Appl. No.: 567,502

[22] Filed: Aug. 14, 1990

Related U.S. Application Data

[63] Continuation-in-part of Ser. No. 510,387, Apr. 17, 1990, abandoned.

[51] Int. Cl.⁵ .................... B32B 31/14; F16L 11/00
[52] U.S. Cl. .................... 428/34.9; 156/85; 156/86; 174/DIG. 8; 174/84 R; 264/230; 428/167
[58] Field of Search ............. 156/85, 86; 174/DIG. 8, 174/84 R; 428/34.9, 35.1, 167; 264/230

[56] References Cited

U.S. PATENT DOCUMENTS

| | | | |
|---|---|---|---|
| 2,725,621 | 12/1955 | Gates | 29/413 |
| 3,515,798 | 6/1970 | Sievert | 174/135 |
| 4,045,604 | 8/1977 | Clabburn | 428/36 |
| 4,070,746 | 1/1978 | Evans | 29/450 |
| 4,287,012 | 9/1981 | Midgley et al. | 428/43 |
| 4,332,849 | 6/1982 | Barkus et al. | 174/DIG. 8 |
| 4,389,440 | 6/1983 | Keith | 428/34.9 |
| 4,410,009 | 10/1983 | Blum | 174/DIG. 8 |
| 4,506,430 | 3/1985 | Guzay, Jr. | 29/450 |
| 4,585,607 | 4/1986 | Krackeler et al. | 428/34.9 |
| 4,685,189 | 8/1987 | Polmquist et al. | 29/450 |
| 4,686,967 | 9/1989 | Holt et al. | 29/450 |
| 4,871,599 | 10/1989 | Knorr | 428/34.9 |

Primary Examiner—James J. Seidleck
Attorney, Agent, or Firm—A. Stephen Zavell; Herb Burkard

[57] ABSTRACT

A method for covering a substrate comprising the steps of:

positioning over the substrate an assembly including a recoverable elastomeric sleeve and a mandrel upon which the sleeve is mounted under tension in an expanded condition such that upon release of the tension the sleeve tends to assume a smaller cross-sectional dimension and thereupon cover the substrate; the mandrel having a generally tubular configuration and defining a series of spaced apart, substantially longitudinal projections extending radially outwardly, the sleeve being in substantial contact with the longitundinal projections; and, withdrawing the mandrel from the sleeve by sliding the mandrel longitudinally away from the sleeve while maintaining its position over the workpiece, the sleeve thereby progressively assuming a smaller cross-sectional dimension to cover the substrate as the mandrel is progressively withdrawn.

The substrate may be a high voltage termination or cable splice, and the mandrel may include a medial annular transverse tearline enabling breaking and separation of the mandrel into two segments for facilitating withdrawal from, and recovery of, the sleeve. A lubricating agent may be placed between the longitudinal projections. The sleeve may be provided with end segments which avoid contact with the lubricating agent and which are unfolded following release of the sleeve onto the substrate thereby to seal the ends thereof.

19 Claims, 7 Drawing Sheets

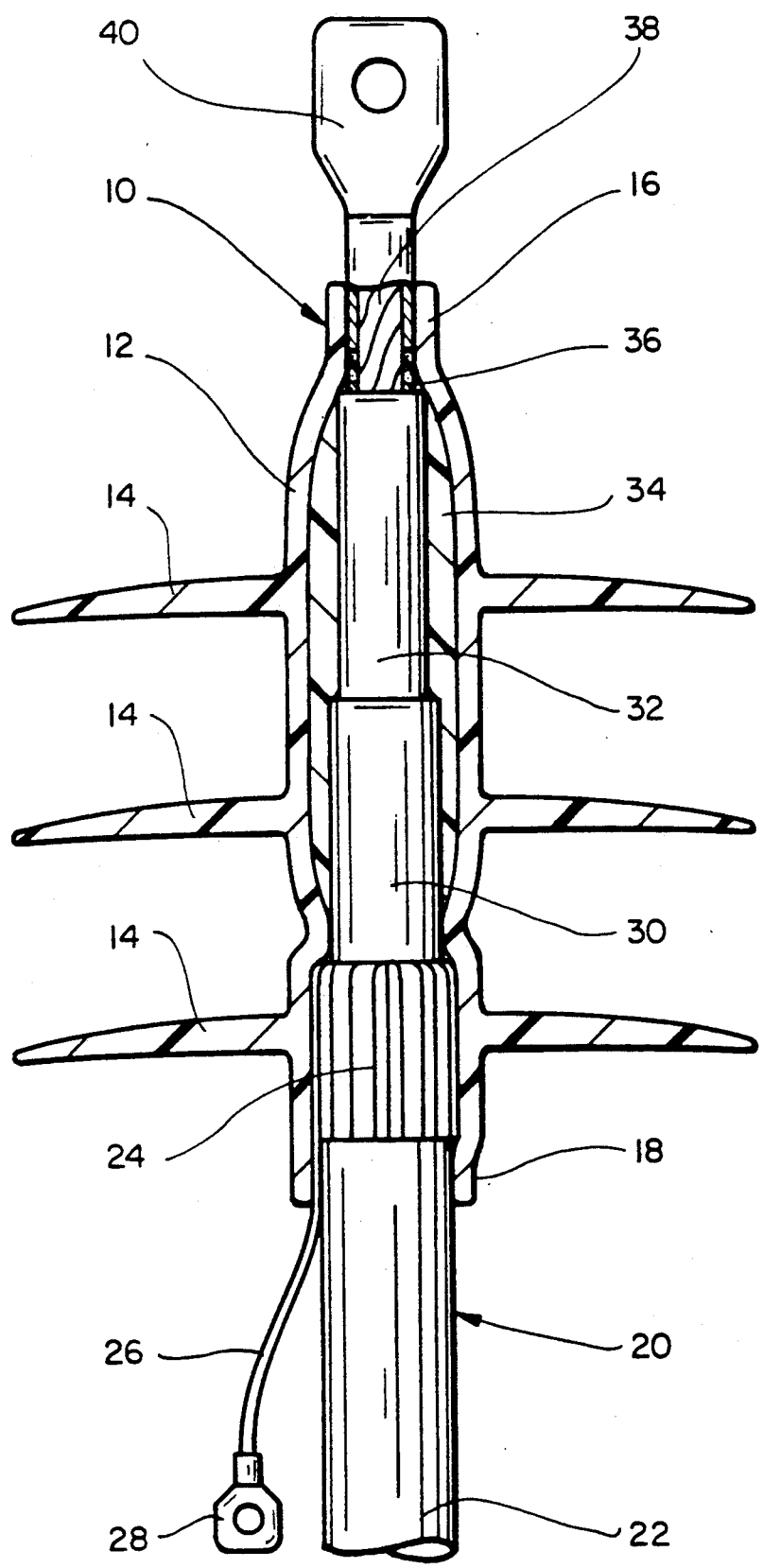
FIG_1

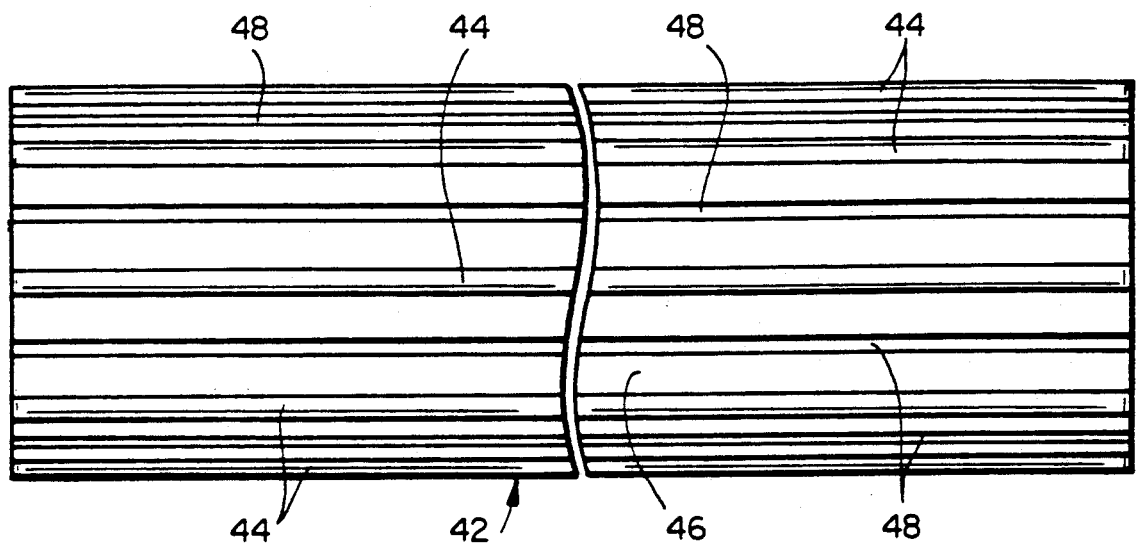
FIG_2
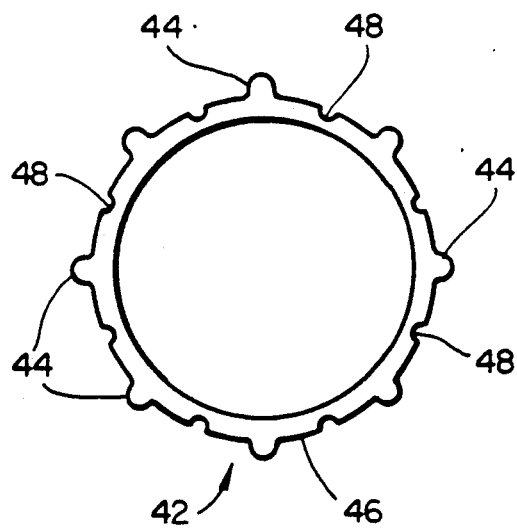
FIG_3

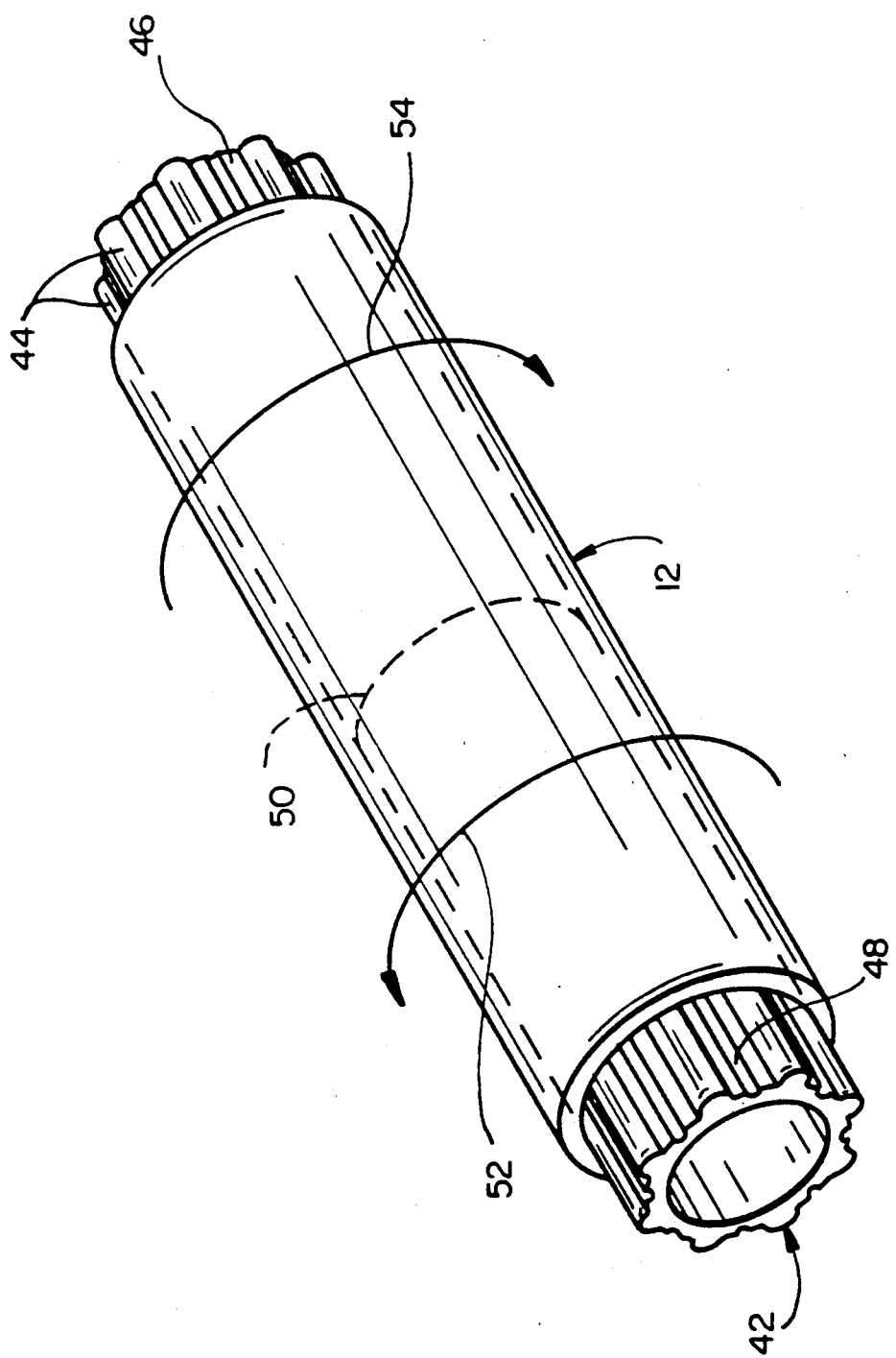
FIG_4

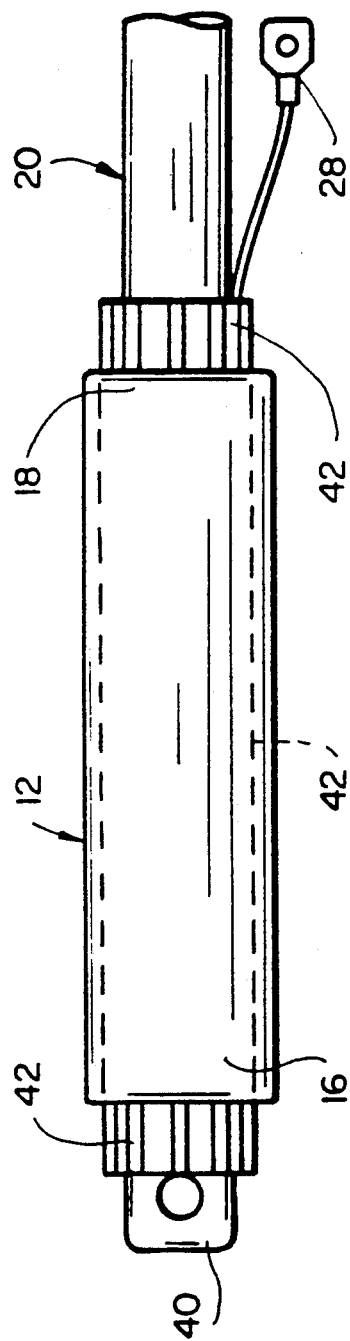
FIG_5
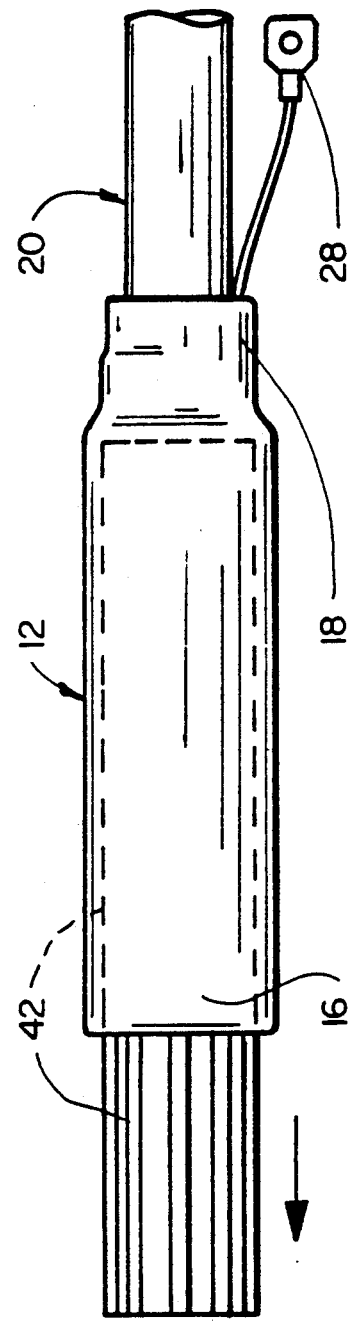
FIG_6

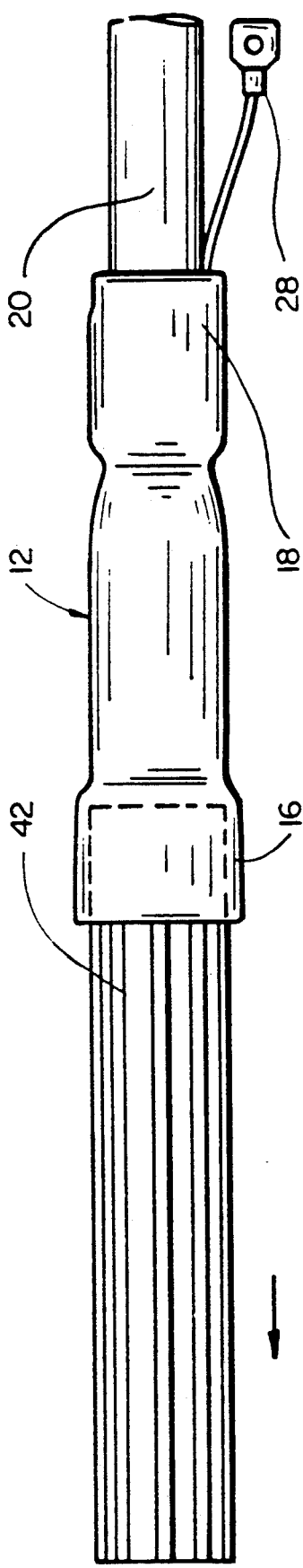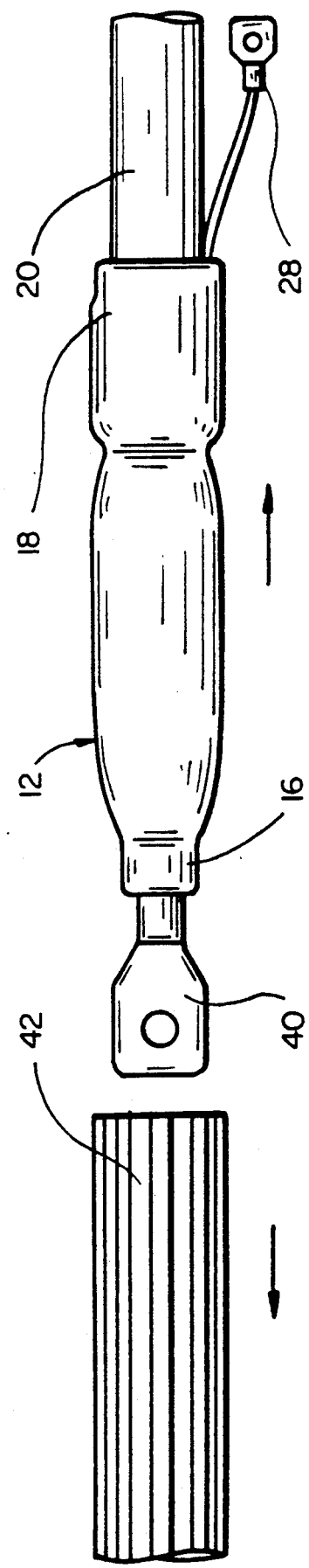

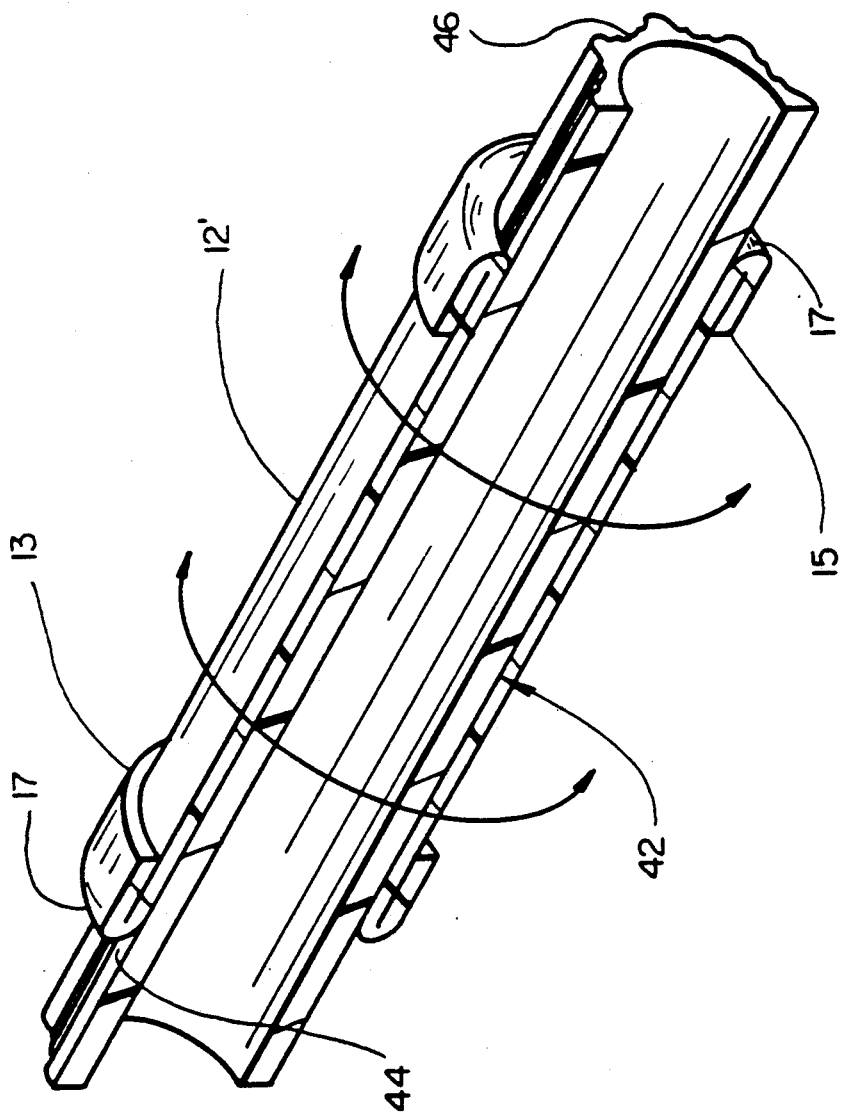
FIG_9

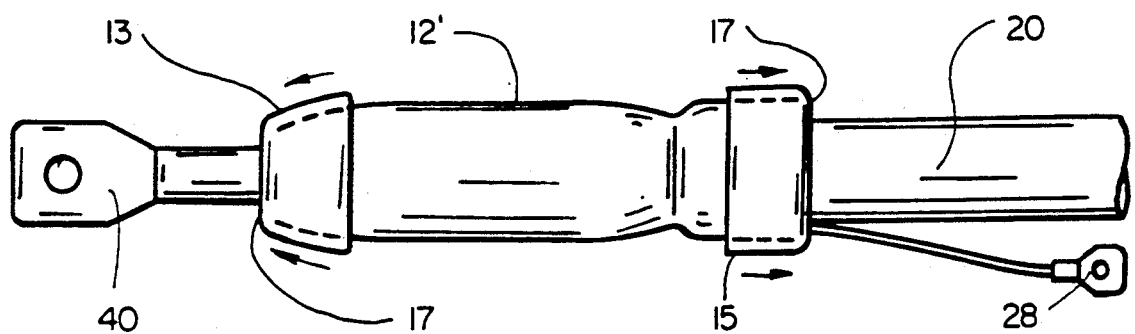
FIG_10
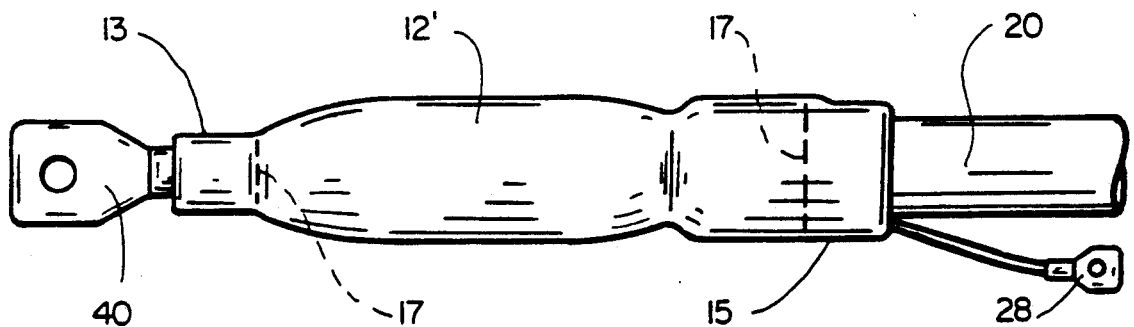
FIG_11

RECOVERABLE ELASTOMERIC SLEEVE AND METHOD FOR INSTALLATION AND USE

REFERENCE TO RELATED APPLICATION

The present application is a continuation-in-part of U.S. patent application Ser. No. 07/510,387, filed on Apr. 17, 1990 now abandoned.

FIELD OF THE INVENTION

The present invention relates to sleeves for covering, protecting and insulating elongate substrates, such as high voltage cable splices and terminations, for example. More particularly, the present invention relates to apparatus and method for covering an elongate substrate with a recoverable elastomeric sleeve.

BACKGROUND OF THE INVENTION

The need to cover substrates with sleeves made of polymeric material is well known. One particularly useful application of radially recoverable elastomeric sleeves is in the electrical cable field. Commonly assigned U.S. Pat. No. 4,045,604 to Clabburn describes a heat recoverable polymeric shedded sleeve for high voltage terminations; its disclosure is incorporated herein by reference. Heat shrink technology is used to recover and conform the sleeve disclosed in the referenced patent to the electrical termination. While heat shrink technology works very well, it requires use of a heat source, such as a torch, to cause recovery of the polymer during installation.

Another approach to installation of a radially recoverable elastomeric sleeve is described in U.S. Pat. No. 3,515,798 to Sievert, and in U.S. Pat. No. 4,389,440 to Keith. These patents describe elastomeric sleeves which are installed and maintained in radial tension or expansion upon a mandrel or core formed as a rigid, one piece spiral construction with a helical weakness or tear line integrally formed into the construction. The elastomeric sleeve is recovered and conformed to the substrate by pulling and tearing the core so that it ruptures and unravels along the tear line and thereby ceases to hold the sleeve in radial tension.

This prior approach has the drawback of complexity and expense associated with the formation of the special core. Further, the inner diameter of the assembly must be significantly greater than the diameter of the substrate to provide sufficient clearance to permit unravelling of the core. Also, because the tear line builds a structural weakness into the assembly, the assembly is somewhat susceptible to premature release and failure in the event that it is subjected to blows or other forces in transit to the worksite where it is to be installed.

A further approach for covering a substrate or workpiece with a recoverable sleeve is to be found in the disclosure of commonly assigned U.S. Pat. No. 4,070,746 to Evans, et al. With the approach described therein a sleeve was bonded in radially expanded or extended state to an outer restraint. The bond between the restraint and the sleeve was sufficiently strong to retain the sleeve in its expanded condition under ordinary conditions of storage and handling, and was broken for installation upon the substrate by application of a suitable bond-attacking solvent. While the approach described in this patent works quite well, it has the drawback of added cost, and the need for providing and applying the solvent at the installation worksite.

Another approach for installing a sleeve upon an electrical termination, for example, is disclosed in U.S. Pat. No. 4,685,189 to Palmquist et al. The approach of this patent is to provide a pliable sleeve which is turned inside out and lubricated when fitted upon the substrate such that the sleeve rolls over itself as it is positioned longitudinally over the previously prepared substrate, e.g. a cable end. However, if weather sheds are needed for high voltage terminations, those sheds must be separate from the sleeve and fitted over the sleeve after installation.

A double walled sleeve which is also installed by revolving over a substrate by shear between the two walls is described in the commonly assigned U.S. Pat. No. 4,868,967 to Holt et al., the disclosure of which is hereby incorporated by reference. While this rollover approach is successful for the intended purpose of providing electrical and/or environmental protection high voltage weather sheds may be difficult to form integrally with the sleeve.

Thus, a heretofore unsolved problem has remained for an improved recoverable sleeve which may be made and supplied at low cost and which may be easily applied or installed by the craftsman without need for any special tools, i.e. tools not normally available to the craftsperson in the field.

SUMMARY OF THE INVENTION WITH OBJECTS

A general object of the present invention is to provide an improved recoverable sleeve assembly which enables a sleeve thereof to be installed upon a substrate in a manner which overcomes limitations and drawbacks of the prior art.

A more specific object of the present invention is to provide an improved, low cost mandrel for maintaining a recoverable sleeve in radially expanded or extended state for storage, shipment and handling as an assembly and wherein the mandrel may be easily and readily longitudinally withdrawn from the sleeve thereby enabling progressive longitudinal recovery of the sleeve about a substrate.

Another specific object of the present invention is to provide a recoverable sleeve assembly which is rigid and stable throughout a substantial shelf life, which manifests reduced susceptibility to premature release from inadvertent application of forces such as blows, and which enables ready installation and radial recovery of the sleeve on the substrate during installation without tools or external materials.

A further specific object of the present invention is to provide a mandrel for maintaining a recoverable sleeve in radially expanded state wherein the mandrel is so configured to store and dispense a lubricant material between opposed surfaces of the sleeve and the mandrel as a preliminary to release and installation of the sleeve, so that the mandrel may be readily withdrawn, enabling progressive radial recovery or shrinkage of the recoverable sleeve without requiring heat, tools or external materials.

One more object of the present invention is to provide a recoverable sleeve which may include integral weather sheds for outdoor ambient high voltage terminations which may be readily installed in a manner constituting a significant advance over the prior art.

In accordance with the principles of the present invention, a method for covering a prepared substrate, such as a high voltage electrical termination for example, comprises the steps of:

positioning over the prepared substrate an assembly including a recoverable elastomeric sleeve and a mandrel upon which the sleeve is mounted in an expanded condition such that upon release the sleeve tends to assume a smaller cross-sectional dimension and thereupon enclose upon and protect the substrate; the mandrel having a generally tubular configuration and defining a series of spaced apart, substantially longitudinal rib projections extending radially outwardly from a generally tubular outer surface, the sleeve being in substantial contact with the rib projections and in reduced or minimized contact with the tubular outer surface, and withdrawing the mandrel from the sleeve by sliding the mandrel longitudinally away from the sleeve while maintaining its position over the substrate, the sleeve thereby progressively assuming a smaller cross-sectional dimension in an over-fitting engagement about the substrate as the mandrel is progressively withdrawn.

In one aspect of the present invention, the step of positioning the assembly over the substrate comprises positioning the assembly over a prepared high voltage cable end; and, in a related aspect of the present invention, the sleeve defines a plurality of spaced-apart integrally formed weathersheds.

In one more aspect of the present invention, the step of withdrawing the mandrel comprises the steps of providing the mandrel with at least one longitudinal slit or tear line for enabling the mandrel readily to be removed after installation of the sleeve, even when the sleeve is not positioned at an end of the substrate, by spreading the mandrel body along the slit or tear line in order to define a longitudinal space sufficient to permit the mandrel body to be removed from the substrate.

In another aspect of the present invention, the mandrel defines a generally annular transverse tearline enabling the mandrel to separate into two tubular segments in response to a bending force, and the step of withdrawing the mandrel comprises the steps of bending the mandrel in order to cause it to separate into two tubular segments and then withdrawing each segment such that a medial portion of the sleeve first progressively assumes a smaller cross-sectional dimension.

In a further aspect of the present invention, the step of positioning the assembly over the workpiece comprises the step of positioning the assembly over a high voltage cable splice.

In yet another aspect of the present invention, the mandrel is provided with a lubricating agent placed between the longitudinal projections and wherein the step of positioning the assembly over the workpiece includes a preliminary step of twisting the sleeve about the mandrel in order to cause the lubricating agent to reflow between the sleeve and the projections, thereby relubricating any dry areas of the opposing surfaces of the sleeve and mandrel.

In one more aspect of the present invention, the sleeve includes continuous end segments which are folded back against the outside of the sleeve to keep the ends from coming into undesirable contact with the lubricating agent, the folded end segments being released upon the substrate in the folded back position and comprising the further step of unfolding the segments to cover facing end segments of the substrate in a positive, sealing engagement thereon, said unfolding permitting the end(s) to cover a larger diameter substrate end than would be possible by positioning the mandrel itself over the facing end segments, thus a greater diameter use range for the sleeve.

In a still further aspect of the present invention, an assembly for covering a substrate comprising a recoverable elastomeric sleeve and a mandrel upon which the sleeve is mounted under tension in an expanded condition such that upon release of the tension the sleeve tends to assume a smaller cross-sectional dimension and thereupon enclose the substrate, the mandrel having a generally tubular configuration and defining a series of spaced apart, substantially longitudinal projections extending radially outwardly therefrom, the sleeve being in substantial contact with the longitudinal projections.

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is a partially sectioned view in elevation of a high voltage cable termination which includes a sleeve that has been positioned to enclose the prepared cable end; the sleeve being installed in accordance with the principles of the present invention.

FIG. 2 is a view in elevation of a mandrel of a sleeve assembly in accordance with the principles of the present invention, with a portion thereof broken away to save drawing room.

FIG. 3 is an end view in elevation of the FIG. 2 mandrel.

FIG. 4 is a view in perspective of a sleeve assembly in accordance with the principles of the present invention prior to installation-recovery of the sleeve upon a workpiece. High voltage sheds, integrally formed with the FIG. 1 sleeve, are omitted in this figure to add to clarity.

FIG. 5 is a somewhat diagrammatic view of the FIG. 4 sleeve assembly positioned over a prepared end of a shielded electrical power cable FIG. 6 shows an initial position during installation of the sleeve by withdrawal of the mandrel in a longitudinal direction away from the FIG. 5 cable end.

FIG. 7 shows progressive recovery and installation of the sleeve upon the FIG. 5 cable end as the mandrel is progressively removed.

FIG. 8 shows a completed installation of the sleeve about the FIG. 5 cable end with the mandrel fully withdrawn longitudinally.

FIG. 9 illustrates an alternative embodiment of the sleeve depicted in FIGS. 1–8 in which the sleeve is formed with continuous end segments which are folded back against the body of the sleeve when it is loaded on the mandrel.

FIG. 10 illustrates recovery and installation of the FIG. 9 sleeve to cover a substantial portion of a prepared cable end.

FIG. 11 illustrates the unfolded end segments of the FIG. 9 sleeve covering the remaining uncovered portions of the prepared cable end.

DETAILED DESCRIPTION OF PREFERRED EMBODIMENTS

With reference to FIG. 1) one preferred example of a recoverable elastomeric sleeve 10 includes a generally tubular body 12 and e.g. three integrally formed and radially extending weather sheds 14. End regions 16 and 18 effectively enclose the prepared end of a shielded high voltage cable 20. A suitable sealant material may be provided between the cable 20 and the sleeve 10 at the prepared end region 16, 18.

Before proceeding with a discussion of the aspects of one preferred embodiment of the invention, it is to be understood that the term "recoverable elastomeric sleeve" as used herein means a tubular structure which is fabricated from an elastomeric material. However, recoverable sleeves of other materials having elastomer-like physical recovery properties may be used. The elastomeric sleeve must be capable of being stretched or expanded to an extended condition in the radial direction from which the sleeve can recover to a smaller radius upon removal of the restraint holding it in the stretched or extended condition.

For the elastomeric sleeve, virtually any desired material possessing elastomeric recovery properties may be used. The elastomeric material should be one which does not exhibit a substantial permanent set or decrease in recovery on storage. Suitable elastomers include materials such as natural and synthetic polyisoprenes, polybutadiene, styrene-butadiene rubber (SBR), butadiene-acrylonitrile rubber, polychlorophrene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber. The properties of the sleeve 10 are, to a large extent, dependent upon the intended use of the sleeve. Thus, if the sleeve 10 is to be used primarily as an electrical insulation covering, its electrical properties will be of primary importance. On the other hand, if the sleeve will be subjected to much physical abuse, it may be necessary to provide a sleeve which has toughness, good flame resistance, good solvent resistance, etc. For high voltage use, it may be desirable to have a sleeve which has been made semiconductive by dispersing large amounts of suitable fillers or conductive particles in the sleeve or which possesses resistance to tracking and/or erosion.

To some extent, the nature of the sleeve is dependent upon the nature of the restraint as is readily apparent to those skilled in the art. Thus, the force of recovery exerted by the expanded elastomeric sleeve cannot exceed the strength of the restraint. Further, it is necessary to choose a sleeve which is compatible with the restraint to the extent that it can be released from the restraint. These and other aspects of the relationship between the sleeve and the restraint will become clear in the discussion of the present invention following hereinbelow.

By way of further background information pertinent to the discussion of the preferred embodiment, the cable 20 includes an impervious outer jacket 22 of insulative material, such as plastic or rubber, which encloses the cable and protects it from the external ambient environment. A shield 24 may be formed of braided or wound conductive wires or tape, foil, or the like. Wires are shown in FIG. 1, and the wires 26 are bent backwards and collected in a bundle away from the cable 20 and terminate at a crimp-lug termination 28 which enables electrical grounding of the shield 24. A semiconductor layer 30 underlies the shield 24 and overlies a cross-linked polyethylene dielectric core 32.

As part of the preparation of the termination of the cable, a tubular wrapping 34 of material formulated to reduce stresses otherwise present at the end of the semiconductive layer 30 is applied over the layer 30 and over the exposed dielectric 32. Alternatively, a stress layer may be added on the inside surface of elastomeric insulator sleeve 12, for example by coextrusion, laminating, or the like. Suitable sealing materials (not shown) are placed at the sealing ends in order to enhance and facilitate the weathertight sealing of the sleeve 12 over and about the termination. A connection lug 40 is crimped onto the conductor 38 in conventional fashion. The recovered elastomeric insulator sleeve 12 is shown with its outer end 16 sealing about the crimp end of the lug 40, and with its inner end sealing over the outer jacket 22.

FIGS. 2 and 3 show a generally tubular mandrel 42 which may be formed at low cost of an extrudable material, such as acrylic or polyvinylchloride (PVC) having a flexural modulus of about $3 \times 10^5$ psi. Alternatively, the mandrel 42 may be formed of extrudable metal such as aluminum or fiber reinforced plastic resin material, also be extrusion or pultrusion.

The mandrel 42 is formed with e.g. a series of radially projecting ribs 44 which project radially outwardly from an outer surface 46 of the mandrel 42. The ribs 44 are most desirably substantially longitudinal and parallel, although a slight to modest helical geometry for the ribs could be provided without serious detriment to functionality of the mandrel 42 relative to release and recovery of the sleeve 12.

A series of substantially longitudinal shallow troughs or grooves 48 are also defined in the mandrel 42 by the extruder die. The troughs 48 serve as reservoirs or wells for holding a suitable lubricant, such as silicone or fluorosilicone grease, during storage of an assembly comprising the mandrel 42 and the sleeve 12 in radially expanded/extended state. The numbers of ribs 44 and the extent to which they project above the outer major surface 46 of the mandrel is such that the ribs 44 engage opposed inner surface portions of the sleeve 12 and provide a mechanism for applying most, if not all, of the tension thereto required hold the sleeve 12 in its radially expanded or extended state. The ribs 44 thereby reduce significantly the amount of surface area of the mandrel 42 in direct contact with the sleeve 12.

While a mandrel 42 formed with ribs 44 projecting beyond the outer major surface 46 and with intermediate longitudinal troughs or grooves 48 is the presently most preferred embodiment for the mandrel, other suitable geometries are contemplated. For example, the mandrel may be formed with an outwardly scalloped contour, or with suitable teeth, facets or other longitudinal projections and depressions such that the surface area in contact with the sleeve is reduced, and the adjacent depressed longitudinal regions are available for holding the lubricant facilitating release of the sleeve from the mandrel. The mandrel may also be formed with a longitudinal tear line, to facilitate separation of the mandrel along the tear line. Depending upon the application, the tear line may be utilized to cause the mandrel to assume a smaller cross-sectional diameter to facilitate release of the sleeve to cover the substrate, or it may be utilized to define a space sufficient to enable the mandrel to be removed from the substrate (e.g. a cable splice) after the sleeve has been released and has covered the substrate.

The sleeve 12 is loaded onto the mandrel 42 by any suitable conventional expansion technique. A series of guide wires which fit between the ribs 44 works well to load the sleeve 12 onto the mandrel 42. The mandrel 42 may also be processed after its formation by e.g. extrusion to define a transverse annular tear or fracture line 50 at or near the midpoint of its longitudinal dimension. The tear line 50 enables the craftsman to apply a bending or fracturing force to the mandrel 42 and thereby to separate it into two approximately equal length segments which enable the sleeve 12 to begin its recovery at the point of the tear line 50 and thereupon shrink and seal over a cable splice, as opposed to an end termination, for example.

With reference to FIG. 4, just prior to installation of the sleeve 12, the sleeve 12 is gripped by the craftsman's hands and twisted back and forth along torque lines 52 and 54. If the mandrel-sleeve assembly has been assembled for some time, the recoverable elastomeric sleeve 12 may have squeezed all of the lubricant away from the contact surfaces of the ribs 44. By twisting the sleeve 12 circumferentially about the mandrel 42 as depicted in FIG. 4, the twisting action causes the lubricant stored in the wells to be carried over the contact surfaces of the ribs and thereby re-lubricate the ribs to facilitate release and recovery of the sleeve 12 about the prepared cable end on which it is to be used.

FIGS. 5, 6, 7 and 8 depict progressive release of the sleeve 12 from the mandrel 42 for installation about the termination end of the cable 20. In FIG. 5, the loosened and relubricated mandrel-sleeve assembly is positioned over the prepared end of the cable 20. Beginning with FIG. 6, the mandrel 42 is moved longitudinally away from the cable 20 by the left hand, for example, while the sleeve 12 is held in proper position over the substrate by the right hand. As the sleeve 12 moves past the mandrel 42, the sleeve shrinks and recovers to its original shape. Recovery is progressively occurring in FIG. 7 and is complete in FIG. 8. Once the mandrel 42 has been removed, it is spent, and may be discarded or recycled.

FIGS. 9-11 illustrate an alternative preferred embodiment of a sleeve 12'. In these figures, elements which are unchanged from those previously described in conjunction with FIGS. 1-8 bear the same reference numbers, and the prior explanation applies to these elements as before.

The sleeve 12' shown extended upon the mandrel 42 in FIG. 9, is provided with two continuous end segments 13 and which are shown folded back against the body of the sleeve 12' along generally annular, transverse fold. In some circumstances it has been determined to be most advantageous to prevent the continuous end segments 13 and 15 from coming into contact with the lubricating agent stored on the mandrel 42 between the ribs 42.

FIG. 10 shows the sleeve 12' after it has been released by withdrawal of the mandrel as before, but before the continuous end segments 13 and 15 are unfolded to cover correspondingly facing end segments of the substrate (prepared cable end) 20. FIG. 11 illustrates the completed covering wherein the end segments 13 and 15 have been unfolded along the fold loci 17 to cover adjacently facing segments of the substrate. Thus, seen that the end segments 13 and 15 are kept from coming into contact with the release-promoting lubricating agent otherwise in contact with the inner sidewall of the substrate 12'.

The mandrel-sleeve assemblies in accordance with the principles of the present invention are very stable and durable during storage and handling and are not susceptible to inadvertent release. When used in high voltage cable terminations or splices, the sleeve 12 or 12' may be provided with integral weathersheds 14 (as shown in FIG. 1) in order to reduce and inhibit electrical degradation.

It is to be understood that the foregoing example is merely illustrative of the invention, and that the scope is not limited to the exemplary embodiment of the invention disclosed hereinabove. For example, the sleeve can be used in low voltage terminations and cables and with other electrical equipment such as bus bars, bushings, cable breakouts, and the like. The sleeve may be closed at one end thereby forming a cap to enclose the end of a cable, etc. The mandrel may define at least one longitudinal tear line so that it may split incident to release of the sleeve to promote recovery thereof and removal of the mandrel, or following release to facilitate removal of the mandrel from the substrate, as in the instance of a cable splice, for example. To those skilled in the art, many changes and widely varying embodiments will suggest themselves without departing from the invention, the scope of which is more particularly set forth in the following claims.

What is claimed is:

1. An assembly for covering a substrate comprising a recoverable elastomeric sleeve means for covering the substrate, and mandrel means upon which the sleeve means is mounted in an expanded condition such that upon release the sleeve means assumes a smaller cross-sectional dimension in order to cover the substrate, the mandrel means having a generally tubular configuration and defining a series of spaced apart, substantially longitudinal projections extending radially outwardly therefrom, the sleeve means being in substantial contact with the longitudinal projections.

2. The assembly set forth in claim 1 wherein the longitudinal projections comprise ribs extending radially outwardly from a generally tubular outer surface of the mandrel means, the sleeve means being in substantial contact with the ribs.

3. The assembly set forth in claim 2 further comprising a series of longitudinal troughs defined in the generally tubular outer surface between the ribs, and sleeve lubricating means contained in the troughs for lubricating the sleeve means relative to the mandrel means.

4. The assembly set forth in claim 3 wherein the lubricating means comprises a silicone- or fluorosilicone-based lubricant.

5. The assembly set forth in claim 1 further comprising a transverse fracture line formed in the mandrel means for enabling it to be separated into two segments along the fracture line to facilitate release and recovery of the sleeve means to close over the substrate.

6. The assembly set forth in claim 5 wherein the substrate is a cable splice.

7. The assembly set forth in claim 1 wherein the substrate is a cable termination.

8. The assembly set forth in claim 7 wherein the sleeve means is for a high voltage termination and comprises a plurality of weathersheds integrally formed as a part thereof.

9. The assembly set forth in claim 1 wherein the sleeve means has an inner layer of stress control material.

10. The assembly set forth in claim 1 wherein the mandrel means is provided with at least one longitudinal separation line means for enabling the mandrel to split longitudinally along the separation line means.

11. The assembly set forth in claim 1 wherein the sleeve means is provided with continuous end segments which are folded back against adjacently facing outer wall segments of the sleeve means while it is mounted in an expanded condition upon the mandrel means, the end segments being unfolded to cover corresponding adjacently facing end segments of the substrate following release of the sleeve means from the mandrel means onto the substrate.

12. A method for covering a substrate comprising the steps of:
positioning over the substrate an assembly including a recoverable elastomeric sleeve means and a mandrel means upon which the sleeve means is mounted under tension in an expanded condition such that upon release of the tension the sleeve means tends to assume a smaller cross-sectional dimension and thereupon enclose and cover the workpiece; the mandrel means having a generally tubular configuration and defining a series of spaced apart, substantially longitudinal projections extending radially outwardly, the sleeve means being in substantial contact with the longitudinal projections, and
withdrawing the mandrel means from the sleeve means by sliding the mandrel means longitudinally away from the sleeve means while maintaining its position over the substrate, the sleeve means thereby progressively assuming a smaller cross-sectional dimension for covering the substrate as the mandrel means is progressively withdrawn.

13. The method set forth in claim 12 wherein the step of positioning the assembly over the substrate comprises positioning the assembly over a prepared high voltage termination.

14. The method set forth in claim 13 wherein the sleeve means defines a plurality of spaced-apart integrally formed weathersheds.

15. The method set forth in claim 12 wherein the mandrel means defines a mandrel having a generally annular transverse tearline for enabling the mandrel to separate into two tubular segments in response to a bending force, and wherein the step of withdrawing the mandrel means comprises the steps of bending the mandrel in order to cause it to separate into two tubular segments and withdrawing each segment such that a medial portion of the sleeve means first progressively assumes a smaller cross-sectional dimension.

16. The method set forth in claim 15 wherein the step of positioning the assembly over the substrate comprises the step of positioning the assembly over a high voltage cable splice.

17. The method set forth in claim 12 wherein the mandrel means is provided with a lubricating agent placed between the longitudinal projections and wherein the step of positioning the assembly over the substrate includes a preliminary step of twisting the sleeve means about the mandrel means in order to cause the lubricating agent to flow between an inner surface of the sleeve means and the projections.

18. The method set forth in claim 12 wherein the sleeve means is provided with continuous end segments which are folded back over the body of the sleeve means when mounted upon the mandrel means and wherein the step of withdrawing the mandrel means from the sleeve means enables the sleeve means to recover upon a major central segment of the substrate, and comprising the further steps of unfolding the end segments of the sleeve means thereby to cover adjacently facing end segments of the substrate.

19. The method set forth in claim 12 wherein the mandrel means is provided with at least one longitudinal separation line means and comprising the further step of separating the mandrel along the separation line means.

* * * * *